United States Patent [19]

Kim

[11] Patent Number: 5,471,273
[45] Date of Patent: Nov. 28, 1995

[54] CAMERA BACKCOVER CLOSING PREVENTION DEVICE

[75] Inventor: Yong-han Kim, Kyeongsangnam-do, Rep. of Korea

[73] Assignee: Samsung Aerospace Industries, Ltd., Kyeongsangnam-do, Rep. of Korea

[21] Appl. No.: 265,763

[22] Filed: Jun. 27, 1994

[30] Foreign Application Priority Data

Jun. 28, 1993 [KR] Rep. of Korea .................. 93-11546 U

[51] Int. Cl.⁶ .................................................. G03B 17/02
[52] U.S. Cl. ............................................................ 354/288
[58] Field of Search ............................... 354/288; 352/34

[56] References Cited

U.S. PATENT DOCUMENTS 5,084,721  1/1992  Burnham .
5,305,039  4/1994  Dassero .

*Primary Examiner*—Monroe H. Hayes
*Attorney, Agent, or Firm*—Finnegan, Henderson, Farabow, Garrett & Dunner

[57] ABSTRACT

A camera backcover closing prevention device capable of preventing the backcover of a camera from accidentally closing due to its own weight when a user of the camera wishes to load into or unload the film from the camera. The camera backcover closing prevention device includes a backcover rotatably attached to a camera and having an end portion, and latching member in the camera and engageable with the end portion of the backcover for stopping the rotation of the backcover when the backcover is fully open.

5 Claims, 1 Drawing Sheet

CAMERA BACKCOVER CLOSING PREVENTION DEVICE

BACKGROUND OF THE INVENTION

1. Field of the Invention

The present invention relates generally to a camera backcover closing prevention device. Specifically, the present invention relates to a camera backcover closing prevention device capable of preventing the backcover of a camera from being closed by the weight of the camera backcover itself when mounting or taking out film in the camera.

2. Description of the Related Art

Generally, a user opens the backcover of a camera, mounts a film, and carries out photographing to take the photograph of an object using the camera. After taking the photograph, the user rewinds the film, opens the backcover, and takes out the film.

In a conventional camera, the backcover tends to close by itself due to its own weight, depending on the position in which the user holds the camera when he mounts or removes film from the camera after opening it.

Specifically, the backcover of the camera remains open as long as the user holds the camera parallel to the ground. But when the user holds the camera at a particular angle to the ground, the backcover closes due to its own weight. This happens even when the user does not want the backcover closed so that the user is forced to open the backcover again to either mount or take out film.

SUMMARY OF THE INVENTION

An object of the present invention is to provide a camera backcover closing prevention device that overcomes the disadvantages of the conventional device.

To achieve this and other objects and in accordance with the purpose of the invention, as embodied and broadly described herein, a camera backcover closing prevention apparatus includes a backcover rotatably attached to a camera and having an end portion; and latching means in the camera and engageable with the end portion of the backcover for stopping the rotation of the backcover at times when the backcover is rotated at a predetermined angle with respect to the camera.

According to another aspect of the present invention, a camera backcover closing prevention apparatus includes a backcover rotatably attached to a camera and having an end portion; and latching means in the camera for engaging the end portion. The latching means includes means for providing a first elastic force to the end portion of the backcover to retain the backcover in an open position at times when the backcover is rotated to the open position and means for releasing the backcover from the open position at times when a user of the camera subjects the backcover to a second elastic force greater than and in an opposite direction with respect to the first elastic force.

According to yet another aspect of the present invention, a camera backcover closing prevention apparatus includes a backcover which is attachable to a camera and has an end portion and which is rotatable to an open position from a closed position with respect to the camera when the backcover is open; and latching means in the camera engageable with the backcover for stopping the rotation of the backcover at times when the backcover is rotated to the open position and for retaining the backcover in the open position.

The objects and advantages of the invention will be set forth in part in the description which follows, and in part will be obvious from the description, or may be learned by practicing the invention. The objects and advantages of the present invention will be realized and attained by means of the elements and combination particularly pointed out in the appended claims.

The accompanying drawings, which are incorporated in and constitute a part of the specification, illustrate one embodiment of the invention and together with the description, serve to explain the principles of the invention.

DESCRIPTION OF THE PREFERRED EMBODIMENT

Reference will now be made in detail to the preferred embodiment of the invention, an example of which is illustrated in the accompanying drawings. Wherever possible, the same reference numbers will be used throughout the drawings to refer to the same or like parts.

Figure 1:
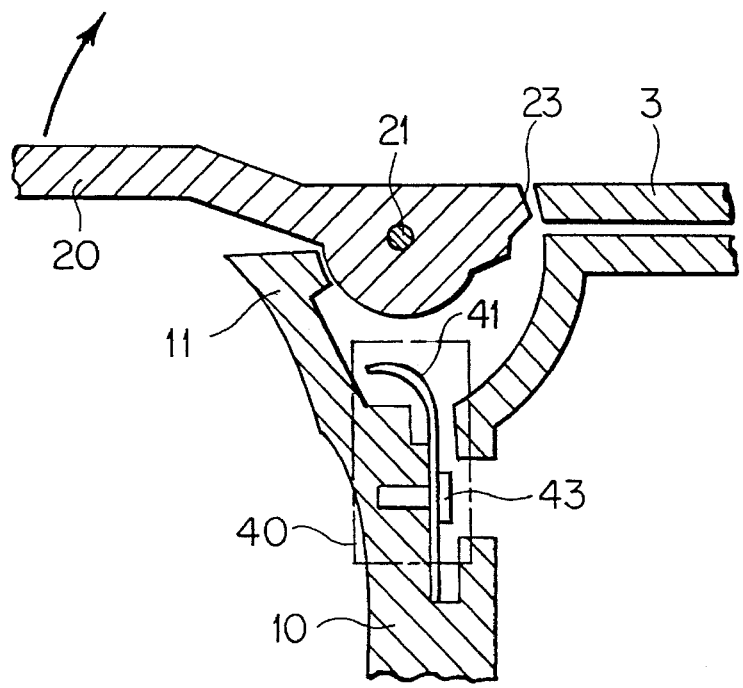
FIG. 1 is a sectional view of a camera backcover closing prevention device in accordance with an embodiment of the present invention.
Figure 2:
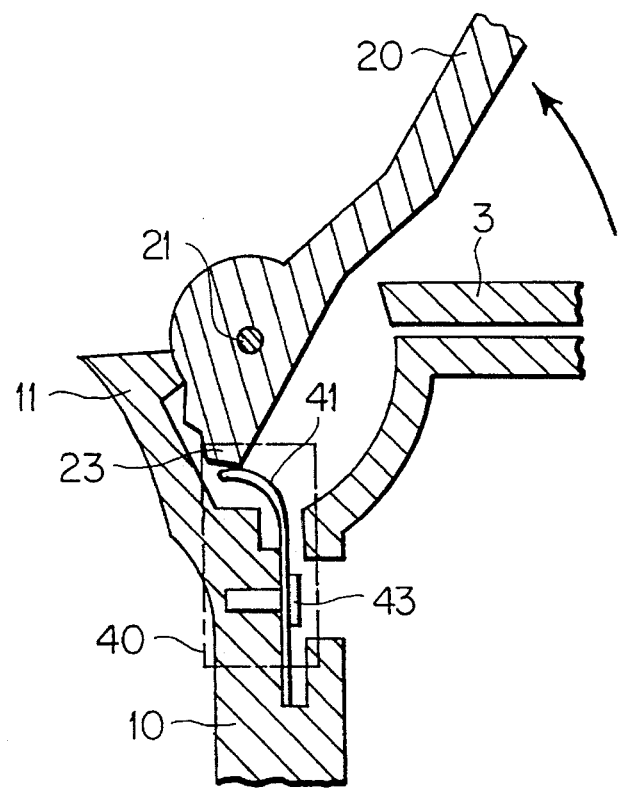
FIG. 2 is a sectional view of an operational state of a camera backcover closing prevention device in accordance with an embodiment of the present invention.

Referring to FIG. 1, a camera backcover closing prevention device is positioned in a camera having a pin 21 of the backcover 20. Referring to FIG. 2, the camera backcover closing prevention device includes the backcover 20 made to rotate around the pin 21 by the user, a supporting part 10 having a latch 11 for preventing rotation due to the weight of the backcover 20 itself, and a latching part 40 mounted in the supporting part 10 for keeping the backcover 20 in an open state.

The latching part 40 includes a plate spring 41 having a predetermined elastic force with respect to the supporting part 10, and a clamp screw 43 for fixing the plate spring 41 to the supporting plate.

The plate spring is used as a supporting means having the elastic force in the preferred embodiment of the present invention, but the present invention is not limited to use with a plate spring.

The operation of the camera backcover closing prevention device according to the preferred embodiment of the present invention is as follows.

As shown in FIG. 1, the backcover 20 rotates in the direction of the arrow, centering on pin 21, when the user rotates the backcover 20 to mount film in the camera.

As the backcover 20 rotates, an end portion of the backcover 20 presses the plate spring 41 of the latching part 40. As the end portion of the backcover 20 presses the plate spring 41, a restoring force of the plate spring 41 is pressed to the backcover 20.

The backcover 20 stops rotating when the backcover 20 rotates around the pin 21 and a lug 23 constructed in the end portion of the backcover 20 is latched on a latch 11 in the supporting part 10.

As show in FIG. 1, the backcover remains open because the restoring force of the plate spring 41 is continuously pressed to the backcover 20 in the direction of rotation when the latch 11 in the supporting part does not bend any more.

The user applies a force to the backcover 20 in the direction of the arrow. This user-applied force must be greater than the force that the plate spring 41 exerts, as shown in FIG. 2, to close the backcover 20 after mounting or taking out the film.

In the preferred embodiment of the invention, the elastic force of the spring is used to prevent the backcover from closing due to its own weight. But the scope of the invention is not limited to use of a spring. Rather, the invention may be used with a member made of mold or rubber having another elastic force.

As described above, the present invention overcomes the problems of conventional camera due to the closing of the backcover. This enables the user of a camera to quickly carry out photographing when mounting or taking out film.

It will be apparent to those skilled in the art that various modifications and variations can be made in the camera and the method of the present invention without departing from the spirit or scope of the invention. Thus, it is intended that the present invention cover the modifications and variations of the invention provided they come within the scope of the appended claims and their equivalents.

What is claimed is:

1. A camera backcover closing prevention apparatus, comprising:
   a backcover rotatably attached to a camera and having an end portion; and
   latching means in the camera and engageable with said end portion of the backcover for stopping the rotation of the backcover at times when the backcover is rotated at a predetermined angle with respect to the camera, wherein said latching means includes means engageable with said end portion of the backcover for retaining the backcover at a fixed position.

2. The backcover closing prevention apparatus of claim 1, wherein said retaining means of the latching means includes means for providing an elastic force for retaining the backcover at a fixed position.

3. A camera backcover closing prevention apparatus, comprising:
   a backcover rotatably attached to a camera and having an end portion; and
   latching means in the camera for engaging said end portion, said latching means including means for providing a first elastic force to said end portion of the backcover to retain the backcover in an open position at times when the backcover is rotated to said open position and means for releasing the backcover from said open position at times when a user of the camera subjects the backcover to a second elastic force greater than and in an opposite direction with respect to the first elastic force.

4. A camera backcover closing prevention apparatus, comprising:
   a backcover attachable to a camera and having an end portion, said backcover rotatable to an open position from a closed position with respect to the camera when the backcover is open; and
   latching means in the camera engageable with the end portion of the backcover for stopping the rotation of the backcover at times when the backcover is rotated to said open position and for retaining the backcover in said open position.

5. A camera backcover closing prevention device, comprising:
   a backcover connected to a camera body by a pin, said backcover being rotatable around said pin from a closed position to a fully open position and having an end portion with an opening for the pin, said end portion being curved around a section of the opening for the pin and having a straight section at a location adjacent to the curved section;
   a latch for stopping rotation of the backcover when the backcover rotates to said fully open position, said latch preventing the backcover from rotating further by contacting the straight section of the end portion; and
   means for applying an elastic force to the end portion of the backcover to bias the backcover to said fully open position.

* * * * *